May 3, 1955  G. J. RICCI, JR  2,707,532
RECESSED DISC BRAKE ASSEMBLY
Filed Jan. 29, 1954  2 Sheets-Sheet 1

George J. Ricci, Jr.
INVENTOR.

May 3, 1955     G. J. RICCI, JR     2,707,532
RECESSED DISC BRAKE ASSEMBLY
Filed Jan. 29, 1954     2 Sheets-Sheet 2

George J. Ricci, Jr.
INVENTOR.

BY *(signatures)*
Attorneys

United States Patent Office 2,707,532
Patented May 3, 1955

2,707,532

RECESSED DISC BRAKE ASSEMBLY

George J. Ricci, Jr., St. Paul, Minn., assignor of one-fourth to Joseph A. Ricci, St. Paul, Minn.

Application January 29, 1954, Serial No. 406,910

6 Claims. (Cl. 188—59)

This invention relates to improvements in brake assemblies for vehicles such as railway trucks, and has for its primary object the provision of means by which current production problems are overcome.

A perplexing problem in the manufacture of railway trucks is the alignment of the brake mechanism which is carried by the truck frame with the brake member carried by the axle. Since the trucks are fabricated as sub-assemblies and since the mechanisms which they support are of varying and large weight, the deflection of the truck frame with respect to the axles is such, when the mechanisms are mounted, as to cause misalignment between the brake assemblies, carried by the frame, and the braking members on the axles. This misalignment is frequently of such magnitude as to prevent full and complete contact of the brake with the braking member. That is, the brake shoe portion is frequently out of alignment to such an extent that it does not fully contact the brake disc or other member utilized on the axle.

This invention overcomes the above problem by providing a brake assembly which is self-aligning and which will at all times permit full brake contact.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
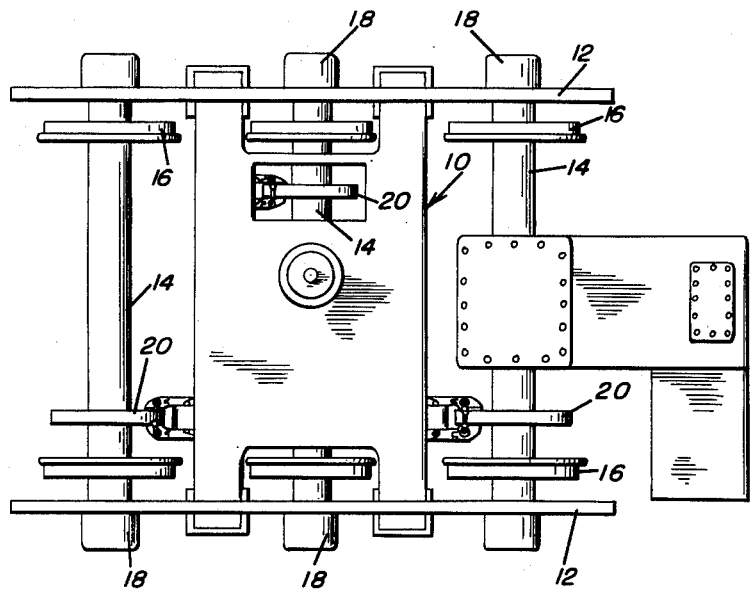
Figure 3 is a plan view of a railway truck constructed in accordance with this invention.

Referring now more particularly to Figure 3, reference numeral 10 indicates the frame of a railway truck generally while reference numeral 12 indicates the side frame members thereof to which the axles 14 and their associated wheels 16 are attached.

The opposite ends of the axles are conventionally journaled in bearing boxes 18 secured to the frame and each axle has a braking member in the form of a disc 20 rigidly attached thereto.

Figure 1:
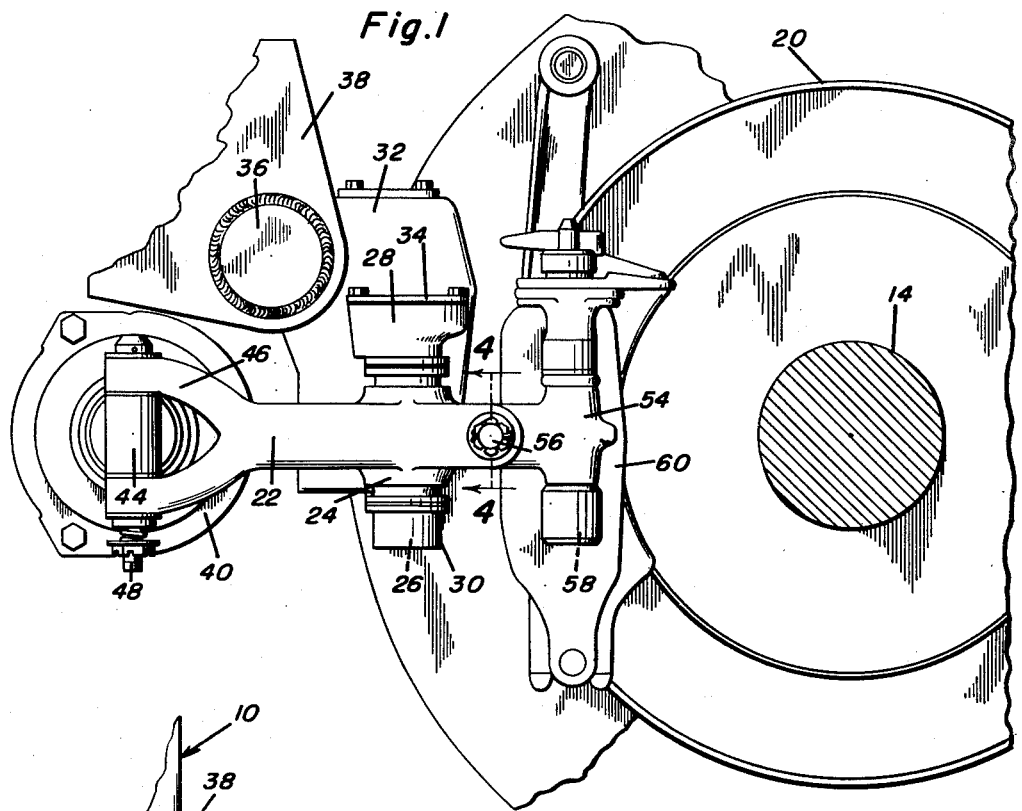
Figure 1 is an enlarged elevation of a portion of a railway truck showing the improved brake assembly in position.
Figure 2:
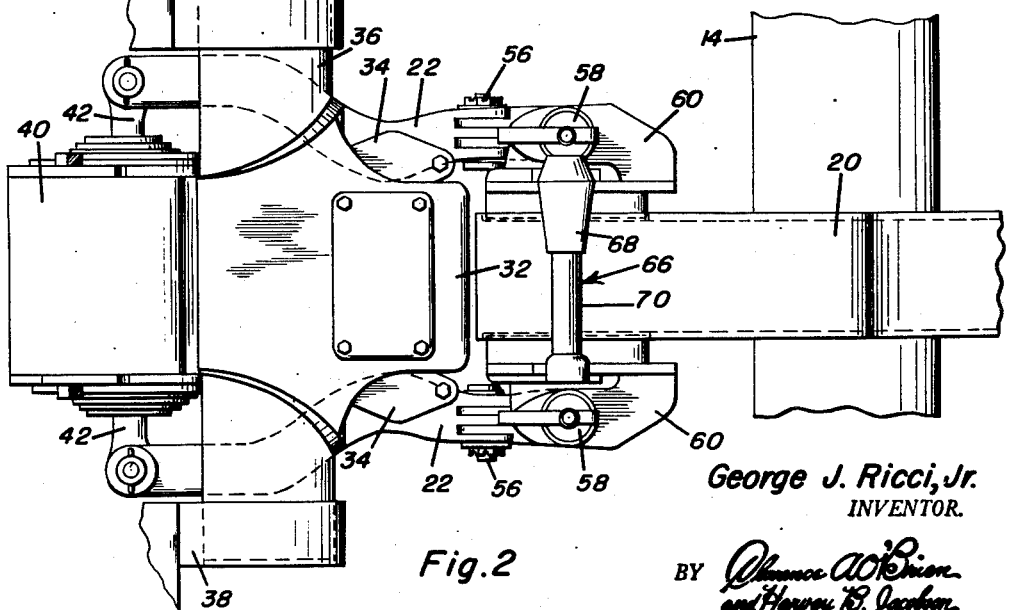
Figure 2 is a plan view of the assembly shown in Figure 1.

A brake assembly is associated with each disc 20 and as seen most clearly in Figures 1 and 2 consists of a pair of yoke or arm members 22 having intermediate bosses 24 through which vertical pivot pins 26 project, these pins being journaled at their opposite ends in the bearing block members 28 and 30 rigid with the housing member 32. The upper blocks 28 are provided with a removable cover 34 for installing the pins and it is preferred that the pins are pinned or otherwise secured against rotation in the bosses 24.

The housings 32 are provided with a horizontal mounting bar 36 having mounting plates 38 welded to its opposite ends, the plates being in turn welded to the truck frame. The housings also carry the cylinders 40 within which opposed piston members (not shown) are reciprocably received, each piston being provided with a plunger 42 projecting outwardly of its cylinder and having an enlarged boss 44 at its free end.

Figure 4:
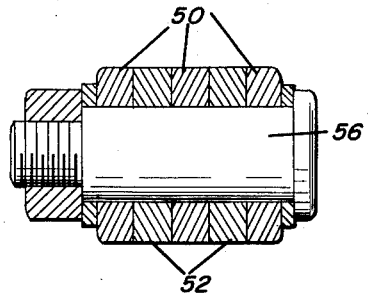
Figure 4 is an enlarged vertical section taken along the plane of section line 4—4 in Figure 1.
Figure 5:
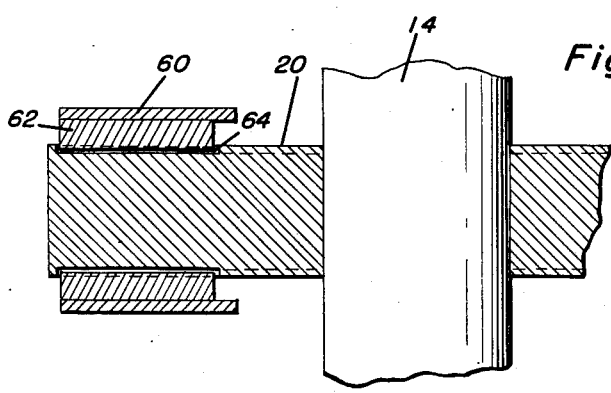
Figure 5 is an enlarged sectional view of the brake disc and a portion of the shoe assemblies.

One end of the arms 22 is bifurcated to present the feet 46 straddling the plunger bosses 44 and vertical pivot bolts 48 connect these members together as will be observed. The opposite ends of the arms are notched vertically presenting spaced ears 50 between which corresponding ears 52 of knuckle members 54 are disposed, the various ears being pivotally interconnected by the horizontal pivot bolts 56, see particularly Figure 4. The free ends of the knuckles carry vertical spindles 58 to pivot the brake shoes 60 thereto. Each brake shoe has an arcuate lining portion 62 received in circumferential grooves 64 on the opposite sides of the brake discs 20, see particularly Figure 5, and each pair of shoes associated with each disk is interconnected by the guide assembly 66 comprising a socket 68 on one shoe and a rod 70 on the other shoe, maintaining the shoes in face to face relation with the disc.

By the construction described above it will be seen that regardless of the deflection of the frame 10 with respect to the axles 14, the brake shoes will remain properly disposed within the disc grooves 64 by virtue of the pivotal connection at 56.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a railway vehicle, a frame, an axle provided with wheels movably supporting said frame, said axle also having a brake disc therefore, a vertical pivot pin on said frame, a brake arm carried by said pin, means connected to one end of said arm for moving the same in a horizontal plane about the axis of said pivot pin, a brake shoe member operably connected to a vertical pivot axis of a member pivoted about a horizontal axis to the other end of said arm and swingable therewith into and out of engagement with said brake disc.

2. In a railway vehicle, a frame, an axle provided with wheels movably supporting said frame, said axle also having a brake disc therefore, a vertical pivot pin on said frame, a brake arm carried by said pin, means connected to one end of said arm for moving the same in a horizontal plane about the axis of said pivot pin, a brake shoe member operably connected to a vertical pivot axis of a member pivoted about a horizontal axis to the other end of said arm and swingable therewith into and out of engagement with said brake disc, said disc having a peripheral groove in one face, and said brake shoe having a portion disposed within said groove.

3. In a railway vehicle, a frame, an axle provided with wheels movably supporting said frame, said axle also having a brake disc therefore, a vertical pivot pin on said frame, a brake arm carried by said pin, means connected to one end of said arm for moving the same in a horizontal plane about the axis of said pivot pin, a brake shoe knuckle pivoted about a horizontal axis to the other end of said arm, a brake shoe pivoted about a vertical axis to a free end of said knuckle and swingable therewith into and out of engagement with said brake disc.

4. In a railway vehicle, a frame, an axle provided with wheels movably supporting said frame, said axle also having a brake disc therefore, a vertical pivot pin on said frame, a brake arm carried by said pin, means connected to one end of said arm for moving the same in a horizontal plane about the axis of said pivot pin, a brake shoe knuckle pivoted about a horizontal axis to the other end of said arm, a brake shoe pivoted about a vertical axis to a free end of said knuckle and swingable therewith into and out of engagement with said brake disc, said disc having a peripheral groove in one face, and said brake shoe having a portion disposed within said groove.

5. In a railway vehicle, a frame, an axle carried on said frame including wheels movably supported on said frame, a rotatable brake disc fixedly secured on said axle member, a pair of spaced vertical pivot pins on said frame disposed in opposite sides of said brake disc, brake arms carried by said pins, means connected to an end of said arms for moving the same in a horizontal axis about said pivot pins, a brake shoe knuckle pivoted about a horizontal axis to the other end of said arms, a brake shoe pivoted about a vertical axis to a free end of said knuckle and swingable therewith into and out of engagement with said brake disc.

6. In the combination as set forth in claim 5 wherein said brake disc includes peripheral grooves in opposite faces of said brake disc, and said brake shoes include an arcuate portion disposed within said grooves.

References Cited in the file of this patent

UNITED STATES PATENTS

| | | |
|---|---|---|
| 2,174,401 | Farmer | Sept. 26, 1939 |
| 2,293,975 | Eksergian | Aug. 25, 1942 |